United States Patent [19]

Mandal et al.

[11] Patent Number: 5,846,402
[45] Date of Patent: Dec. 8, 1998

[54] PROCESS FOR CATALYTIC CRACKING OF PETROLEUM BASED FEED STOCKS

[75] Inventors: Sukumar Mandal; Suresh Kumarshah; Debasis Bhattacharyya; Vutukuru Lakshmi Narasimha Murthy; Asit Kumar Das; Sanjeev Singh; Ram Mohan Thakur; Shankar Sharma; Jagdev Kumar Dixit; Sobhan Ghosh; Satyen Kumar Das; Manoranjan Santra; Latoor Lal Saroya; Marri Rama Rao; Ganga Shanker Mishra, all of Faridabad; Satish Makhija, Vasant Kunj, all of India

[73] Assignee: Indian Oil Corporation, Ltd., Bandra, India

[21] Appl. No.: 855,946

[22] Filed: May 14, 1997

[51] Int. Cl.$^6$ .................................... C10G 11/00
[52] U.S. Cl. .................... 208/113; 208/150; 208/153; 208/120; 585/651; 585/653
[58] Field of Search .................... 208/120, 150, 208/153; 585/651, 653

[56] References Cited

U.S. PATENT DOCUMENTS

| | | | |
|---|---|---|---|
| 4,874,503 | 10/1989 | Herbst et al. | 208/120 |
| 4,980,053 | 12/1990 | Li | 585/651 |
| 5,292,976 | 3/1994 | Dessau et al. | 585/651 |
| 5,326,465 | 7/1994 | Yongqing et al. | 505/651 |
| 5,389,232 | 2/1995 | Adewuyi et al. | 208/120 |
| 5,670,037 | 9/1997 | Zaiting et al. | 585/651 |

FOREIGN PATENT DOCUMENTS 0490886  6/1992  European Pat. Off. .

*Primary Examiner*—Helane Myers
*Attorney, Agent, or Firm*—Spencer & Frank

[57] ABSTRACT

A process for selective catalytic cracking of a petroleum-based feedstock to produce a product having a high yield of liquified petroleum gas (LPG) and light olefins having 3 to 4 carbons includes providing a fluidized bed reactor which is a high velocity riser, continuously circulating fluidized bed reactor; providing a solid acidic catalyst comprised of: from 1 to 6% by wt. of ultra stable Y-zeolite; from 8–25% by wt. of Pentasil zeolite which is shape selective; from 0–8% by wt. of an active material which is bottom selective; from 0–1% by wt. of rare earth constituents; and from 91 to 60% by wt. of nonacidic constituents and binder; charging the fluidized bed reactor with the solid acidic catalyst and the petroleum-based feedstock; and cracking the petroleum-based feedstock in the presence of the solid acidic catalyst in the fluidized bed reactor. The reactor is operated at a Weight Hourly Space Velocity (WHSV) ranging from 40 to 120 hr$^{-1}$, a ratio of solid acidic catalyst to petroleum-based feedstock ranging from 15 to 25, a temperature at the top of the high velocity riser ranging from 530° C. to 600° C., recycled riser products ranging from 0 to 40%, a pressure in the fluidized bed reactor ranging from 1.0 to 4.0 kg/cm$^2$g, and an amount of steam for dilution and quenching of hydrocarbons ranging from 3 to 50 wt. % of the petroleum-based feedstock. The Pentasil zeolite has a pore size ranging from 5 to 6 Å so that the catalyst is highly selective for LPG and C$_4$ light olefins with minimum dry gas and coke make, and so that the vanadium tolerance of the catalyst is increased and ranges up to 21,000 PPM. The process produces a LPG yield ranging up to 40 to 65 wt. % of the fresh petroleum-based feedstock, a selectivity for the light olefins of at least 40 wt. %, and a selectivity for the LPG of at least 45 wt.

8 Claims, No Drawings

PROCESS FOR CATALYTIC CRACKING OF PETROLEUM BASED FEED STOCKS

BACKGROUND OF THE INVENTION

1. Field of the Invention

This invention relates to a process for the production of high yield of LPG and light olefins in the range of $C_3$ and $C_4$ hydro-carbons from various petroleum fractions including residual oils through very high severity catalytic cracking with solid acidic catalyst.

2. Description of the Related Art

Conventionally, liquefied petroleum gas (LPG) is produced in petroleum refineries through Fluid Catalytic Cracking (FCC) process. The FCC process is employed for essentially producing high octane gasoline and diesel blending components and not LPG or light olefins, as LPG is present only about 10–25 wt. % on fresh feed basis depending on the operating severity level. FCC process uses variety of feed stock typically in the boiling range of 370°–500° C. with some quantity of residual oil fractions. However, due to severe coke deposition and catalyst deactivation, present FCC technology can handle upto 6–8 wt. % conradson coke and about 20–40PPM metal level in the feed stock. Typically, FCC LPG obtained from the process of FCC contains about 30 wt. % propylene and 10 wt. % iso-butylene which are usually recovered and used as feed stock for producing petrochemicals. However, the current FCC technology with the conventional cracking catalyst, is not able to maximize LPG beyond 30 wt. % of fresh feed.

Another process which is usually practised for producing light olefins is the high temperature tubular pyrolysis of light petroleum cuts in the range of naphtha and gas oil. However, since the cracking process is thermal in nature, the yield of dry gas (50 wt. % of feed) is much higher as compared to LPG(25 wt. % of feed). In addition, the process is more suitable for ethylene than propylene/iso-butylene production. Moreover, due to susceptibility of coke formation inside tube walls, this process can handle only lighter feed stock in the range of naphtha.

Recently, some new investigations have been made to increase the propylene/iso-butylene selectivity in FCC process. As for example, U.S. Pat. No. 5,389,232 discloses a riser cracking process where 3 wt. % ZSM-5 additive on the catalyst(ZSM-5 is a shape selective high silica zeolite of average 5.4 Angstrom pore opening) was used to increase the yield of $C_3/C_4$ olefins by 7 wt. % of feed with minimum loss of gasoline yield upto 5 wt. % of feed from base value. However, in this process the major objective was to improve propylene/iso-butylene selectivity, keeping the gasoline yield at maximum. As a result, the maximum LPG yield in this process is only upto 18 wt. % of feed stock.

Still another process reported in U.S. Pat. No. 4,980,053 describes a deep catalytic cracking (DCC) process at very low weight hourly space velocity (WHSV) of 0.2–20 $hr^{-1}$ and relatively higher Catalyst/Oil ratio of 2–12 as compared to conventional FCC conditions of 100–300 $hr^{-1}$ WHSV and 4–8 catalyst to oil ratio. The LPG yield is reported to be in the range of 30–45 wt. % using paraffinic gas oil as feed stock. However, the major drawback of this process is its relatively very high yield of dry gas (6–12 wt. %) and coke (4–9 wt. %) even with paraffinic gas oil as feed stock. Moreover, the process with a very unstable by-product gasoline cut of sizeable quantity (20–35%) requiring further downstream treatment. In addition, due to very low WHSV operation, the reactor size is also significantly higher than conventional FCC reactors. There are some combination of processes which have been suggested to overcome the problems of unstable gasoline in this process. For example, International patent publication no.WO 95/13255 discloses a process to combine deep catalytic cracking with steam cracking followed by hydroisomerization of unstable products including MTBE production.

Patent no.EP 0490886 discloses a process for the production of olefins and aromatics from hydrocarbon feed stock by catalytic cracking and dehydrogenating the hydrocarbons in presence of entrained catalyst at short residence time with special emphasis for benzene production. Another process described in JP No.60-222,428 works with $C_5$–$C_{25}$ paraffinic hydrocarbon as feed stock to produce 30% of $C_2$–$C_4$ olefins at very high temperature of 600°–750° C.

To summarise, in all the above processes via catalytic routes, maximum LPG yield is reported to be about 45% considering paraffinic vacuum gas oil as feed stock. These processes are also non-selective which results in very high dry gas and coke yield and require larger reactor size and catalyst capacity due to low WHSV operation. Moreover, none of the available processes has demonstrated heavy residue cracking towards maximum production of LPG and $C_3$–$C_4$ light olefins. On the other hand, the thermal processes are more suitable for ethylene production. The reactor conditions demand very high temperature, lower space velocity and much higher steam dilution (50–80%) to avoid coking in tubes. Also, heavy residual fractions cannot be used as feed stock due to their significantly higher coke making tendency.

A primary object of the present invention is to propose a process for maximizing production of LPG and $C_3$,$C_4$ light olefins with minimum yield of unwanted dry gas, coke, bottom and other unstable liquid products, namely gasoline and diesel.

Another object of this invention is to propose a process for maximum conversion of heavy residual petroleum fractions where the catalyst employed for cracking the feed stock is highly metal resistant with excellent coke and dry gas selectivity while maximising LPG and light olefins yield.

Further objects and advantages of this invention will be more apparent from the ensuing description.

SUMMARY OF THE INVENTION

According to this invention, there is provided a process for Catalytic Cracking of various petroleum based feed stocks to produce high yield of LPG and light olefins with $C_3$ and $C_4$ ie., propylene and butylene in the presence of a solid acidic catalyst and high pore size acidic components for selective bottom cracking and mixtures thereof, in a high velocity riser type continuously circulating fluidized bed reactor operates in the range of 40–120 $hr^{-1}$ Weight Hourly Space Velocity (WHSV), 15–25 catalyst to oil ratio, 530°–600° C. riser top temperature 0–40% recycle of riser products. 1.0–4.0 $kg/Cm^2$ g reactor pressure and steam for dilution and quenching of hydrocarbons ranging from 3–50 wt. % of feed depending on the quality of feed stock, thereby producing LPG yield as high as 40–65 wt. % of fresh feed wherein selectivities of propylene and iso-Butylene are more than 40 wt. % and 45 wt. % of LPG respectively.

In the process under invention, various petroleum fractions, eg. naphtha, gas oil, vacuum gas oil, residual oil fractions are used as feed stock. The feed is first preheated in the range of 150°–350° C. and then injected to a high velocity (>5 mls) pneumatic flow riser type cracking reactor with very short residence time of 2–10 seconds and preferably in the range of 4–7 seconds. Prior to the injection of the fresh feed, the regenerated catalyst is at first contacted with a recycle stream of unconverted hydrocarbons from the process so that recycle components are preferentially cracked at high severity riser bottom conditions before the fresh feed is injected in the riser. Typically, recycle ratio is maintained in the range of 0–40% of fresh feed depending on the type of feed to be processed and the recycle stream consists of gasoline, diesel and unconverted bottom fractions produced in the process. Alternatively, if the recycle quantity is less, it is injected with the fresh feed only. Steam and/or water, in the range of 3–20 wt. % of feed, is added for dispersion and atomisation in the riser. The reaction is carried out at elevated temperature as equivalent to riser top temperature of 530°–600° C. and preferably in the range of 540°–570° C. with higher catalyst to oil ratio(15–25) and very high WHSV of 40–120 hr$^{-1}$ in the presence of a specifically formulated selective catalyst containing predominantly shape selective pentasil with other ingredients of acidic active sites on inert silica alumina base. The hydrocarbon products at the exit of the riser are immediately separated from the catalyst in order to avoid unnecessary bed cracking which leads to more dry gas and coke. The spent catalyst with entrained hydrocarbon is then passed through a stripping section where counter current steam stripping of the catalyst is carried out to remove the hydrocarbon vapours from the spent catalyst.

The stripped catalyst is then regenerated in a dense or turbulent fluidized regenerator in presence of air and/or oxygen containing gases to burn off the coke to achieve the targeted low coke on regenerated catalyst (CRC) of lower than 0.3 wt. % and preferably lower than 0.1 wt. % on catalyst. The regenerated catalyst is circulated to the riser reactor via stand pipe/slide valve and cat/oil ratio is controlled in the desirable range of 15–25 depending on the type of feed stock being processed. Due to the higher catalyst to oil ratio(15–25) used in the present invention, the delta coke(defined such as the difference in coke content of spent and regenerated catalyst) in the process of the present invention is typically 0.3–0.5 wt. % as compared to 0.80–1.1 wt. % in FCC process. Such low delta coke operation in the process of the present invention results in relatively much lower regenerator temperature than observed in the conventional FCC operation using similar type of feed stocks. Typically 0.1 wt. % delta coke change is equivalent to about 10° C. change in regenerator dense temperature. The other important effect of higher catalyst to oil ratio is relatively lower sensitivity of feed conradson coke on the delta coke. For example, a 4% increase in feed coke may increase delta coke as follows:

|  | (UCC) Process of the present invention | FCC |
| --- | --- | --- |
| Cat/Oil | 20 | 6 |
| Delta Coke Change | 0.20 | 0.67 |

This indicates that the process of the present invention (UCC) is about three times less sensitive to feed coke as regards increase in delta coke of the process. This lower delta coke sensitivity of the process of the present invention (UCC) allows us to efficiently crack very heavy feed stock containing even upto 11 wt. % CCR, keeping the regenerator temperature within limit. Still another important implication of high catalyst to oil ratio operation in the process of the present invention, (UCC) is the reduction in residence time requirement in the regenerator. Since delta coke is significantly reduced in the process of the present invention, (UCC) the regenerator residence time required to achieve a particular CRC level considerably come down by about two times as compared to the conventional FCC process.

The hydrocarbon product mixture containing about 50–75 wt. % of the cracked gases is quickly quenched with water/other hydrocarbon products in order to minimize post riser cracking. In the fractionator, the gaseous product is separated from relatively smaller amount of remaining liquid by-products, eg. gasoline, diesel and cracked bottom. The gaseous product mixture from the fractionator top is further compressed and treated to produce the desired LPG, $C_3$–$C_4$ light olefins.

DETAILED DESCRIPTION OF THE PREFERRED EMBODIMENTS

According to the present invention, the feed is first preheated in the temperature range of 150°–350° C. and then injected to a high velocity (>5 m/s) pneumatic flow riser type cracking reactor with very short catalyst residence time of 2–10 seconds and more preferably in the range of 4–7 sec. Prior to the injection of the fresh feed, the regenerated catalyst is at first contacted with a recycle stream of unconverted hydrocarbons from the process so that the recycle components are preferentially cracked at high severity riser bottom conditions before the fresh feed is injected in the riser. Alternatively, if the recycle quantity is less, it is injected with the fresh feed only. Typically, recycle ratio is maintained in the range of 0–40% of fresh feed depending on the type of feed to be processed and the recycle stream consists of gasoline, diesel and unconverted bottom fractions produced in the process. Steam and/or water, in the range of 3–20 wt. % is added for dispersion and atomisation in the riser. The regenerated catalyst enters at the bottom of the riser reactor at very high temperature (650°–750° C.) and the mixing of catalyst with the feed instantaneously produces large quantity of vapour which is sufficient to lift the catalyst particles upwards in the velocity range of >5 m/sec. The riser is preferably made of different stages or more than one diameter to take care of large quantity of the gas production in the invented process. Typically, the weight hourly space velocity in the riser is kept very high (40–120 hr$^{-1}$) and preferably in the range of 50–80 hr$^{-1}$ with high velocity (>5 m/sec.) of product and steam vapours. The residence time in the riser is varied depending on the type of feed stock but typically kept in the range of (4–7 sec.). The temperature and absolute pressure at the riser top is kept in the range of 530°–600° C. and 1.0–4.0 kg/cm$^2$ (gauge) respectively. One of the major important feature of this invention is the maintenance of high space velocity (40–120 hr$^{-1}$) and higher catalyst to oil ratio (15–25) as compared to other state of the art processes, as for example, the process disclosed in U.S. Pat. No. 4980053. We realised that higher space velocity operation in riser cracking apparatus leads to more selective catalytic cracking with minimum thermal cracking reactions which ultimately results in very high olefinic LPG yield keeping dry gas and coke make in the lower side. At this point it is important to note that the process of the present invention (UCC) operates in much different condition than conventional FCC process.

Comparison of major process conditions of the process of the present invention (UCC) with conventional FCC & DCC process is shown below:

|  | (UCC) Process of the present invention | | FCC | DCC |
|---|---|---|---|---|
|  | Range | Preferred Range | Process | Process |
| WHSV, hr$^{-1}$ | 40–120 | 50–80 | 125–200 | 0.2–20 |
| Cat/Oil Ratio | 15–25 | 18–22 | 4–8 | 2–12 |
| Riser temp. °C. | 530–600 | 550–570 | 490–540 | 540–625 |
| Steam injection (riser & reactor) wt. % feed | 3–50 | 20–35 | 0–10 | 5–50 |

We identified that higher catalyst/oil ratio (15–25) and WHSV of 40–120 hr$^{-1}$ along with higher riser temperature are very important in the process of the present invention (UCC) to achieve very high degree of over-cracking for producing maximum LPG. The hydrocarbon products at the exit of the riser is immediately separated from the catalyst through efficient riser termination devices in order to avoid unnecessary bed cracking which leads to more dry gas and coke. The spent catalyst with entrained hydrocarbon is then passed through stripping section where counter current steam stripping of the catalyst is carried out to remove the hydrocarbon vapour from the spent catalyst. Due to the large quantity of gaseous products and higher stripping temperature in the process of the present invention, (UCC) the stripper performance is considerably improved as compared to the conventional FCC process. Consequently, the catalyst residence time in the stripper is required to be kept in the lower side of preferably less than 40 sec. This also helps to minimise undue thermal cracking reactions. The stripped catalyst is then regenerated in a dense or turbulent fluidized regenerator in presence of air and/or oxygen to burn off the coke to achieve the targeted low coke on regenerated catalyst (CRC) of lower than 0.3 wt. % and preferably lower than 0.1 wt. % on catalyst. The regenerated catalyst is then circulated to the riser reactor via stand pipe/slide valve and catalyst to oil ratio is controlled in the desirable range of 15–25 depending on the type of feed stock being processed. At this stage, it is important to note that due to higher catalyst to oil ratio (15–25) used in the present invention, the delta coke (defined as the difference in coke content of spent and regenerated catalyst) in the process of the present invention (UCC) is typically 0.3–0.5 wt. % as compared to 0.80–1.1 wt. % in FCC process. Such low delta coke operation in the process of the present invention results in relatively much lower regenerator temperature than observed in conventional FCC operation using similar type of feed stocks. Typically 0.1 wt. % delta coke change is equivalent to about 10° C. change in regenerator dense temperature. The other important effect of higher catalyst to oil ratio is relatively lower sensitivity of feed conradson coke on the delta coke. For example, a 4% increase in feed coke may increase delta coke as follows:

|  | (UCC) Process of the present invention | FCC |
|---|---|---|
| Cat/oil | 2.0 | 6 |
| Delta Coke Change | 0.20 | 0.67 |

This indicates that the process of the present invention (UCC) is abut three times less sensitive to feed coke as regards increase in delta coke of the process. This lower delta coke sensitivity of the process of the present invention (UCC) allows us to efficiently crack vey heavy feed stock containing even upto 11 wt. % CCR, keeping the regenerator temperature within limit. Still another important implication of high catalyst to oil ratio operation in the process of the present invention (UCC) is the reduction in residence time requirement in the regenerator. Since delta coke is significantly reduced in the process of the present invention, (UCC) the regenerator residence time required to achieve a particular CRC level considerably come down by about two times as compared to conventional FCC process.

The hydrocarbon product from the reactor containing about 50–70% of the cracked gases is quickly quenched with water/other hydrocarbon products in order to minimise post riser cracking. In the fractionator, the gaseous product is separated from relatively smaller amount of remaining liquid by products, as for example, gasoline, diesel and cracked bottom. Due to the very high amount of gaseous components in the product mixture, the design of the fractionator and bottom product section in the process of the present invention (UCC) becomes considerably simpler with lower investment cost for this section as compared to the state of the art FCC process. The gaseous product mixture from the fractionator top is further compressed and treated to produce the desired LPG, $C_3$–$C_4$ light olefins. Further details of feed stock, catalyst, products and operating conditions of the process of the present invention (UCC) are described below.

FEED STOCK

Feed stock for the present invention includes a wide range of hydrocarbon fractions starting from Carbon No. of 5 in naphtha to gas oil, vacuum gas oil, residual oil fractions with Carbon No. more than 100. The fractions could be straight run or cracked components produced by catalytic processes, as for example, hydrocracking, FCC or thermal cracking processes like coking, visbreaking etc. However, the process conditions in the process of the present invention (UCC) are adjusted depending on the type of feed stock so as to maximise the yield of LPG and light olefins. Residual fractions used during the investigation of the present process under invention, covers very heavy petroleum fractions upto 11.0 wt. % conradson carbon content with nickel and vanadium content together in more than 50PPM. More details of the feed stock properties are outlined in the examples given in the subsequent sections of this patent.

CATALYST

Catalyst employed in the process of the present invention (UCC) is unique and predominantly consists of pentasil shape selective zeolites. Other active ingredients, as for example, Y zeolite in rare earth and ultra stable form, bottom cracking components are also added to the catalyst formulation to a limited extent for producing synergistic effect towards maximum LPG and light olefin production. It may be noted that conventional FCC catalyst mainly consists of Y zeolite in different forms as active ingredient to accomplish catalytic cracking reactions. Range as well as typical catalyst composition for the process of the present invention (UCC) and FCC process are summarised below on weight percentage.

|  | (UCC) Process of the present invention | | | FCC | |
|---|---|---|---|---|---|
|  | Range | Preferred Range | Typical | Range | Typical |
| Ultra Stable Y-zeolite | 1–6 | 3.5–4.5 | 4.5 | 8–25 | 15.0 |
| Shape selective Pentasil zeolite | 8–25 | 12–20 | 12.5 | 0–3 | 1.0 |
| Bottom selective active material | 0–8 | 0–5 | 5.0 | 0–15 | 2.0 |
| Rare earth components | 0–1 | 0–0.5 | 0.5 | 0.3–2.5 | 1.8 |
| Non-acidic components & binder | 91–60 | 84.5–70.5 | 77.5 | 91.7–54.5 | 80.2 |

Example of bottom selective active material are silica, alumina and peptized alumina.

Example of rare earth components are lanthanum and cerium in oxide form.

The pore size range of the active components are as follows:

| Ultra stable Y-zeolite, °A. | 8–11 |
|---|---|
| Shape selective Pentasil zeolite, °A. | 5–6 |
| Bottom selective active material, °A. | 50–1000 |

From the above table, it is seen that the process of the present invention (UCC) catalyst composition is markedly different in terms of pentasil zeolite and Y-zeolite content as compared to FCC catalyst. According to the present invention, the active components used in the process of the present invention (UCC) catalyst play synergistic role among themselves and therefore, the design of the catalyst is very much dependent on the type of feed stock to be processed. For example, if the feed is heavy residue, it is observed in the present invention that shape selective component and Y-zeolite component have a synergistic effect towards maximum LPG production as shown below:

| Shape selective zeolite, wt. % | Y-zeolite wt. % | Bottom active component wt. % | LPG wt. % |
|---|---|---|---|
| 12.5 | 4.5 | 5.0 | 38 |
| 17.5 | 3.0 | 2.5 | 32 |

It is seen in the above table that by increasing pentasil zeolite component on the catalyst, LPG yield has actually reduced due to lower bottom conversion. Therefore, the percentage of active components are carefully designed and varied based on the laboratory studies depending on the type of feed stock to be cracked.

The active components in the process of the present invention (UCC) catalyst, as for example, pentasil zeolite, Y zeolite and bottom selective ingredients are supported on inactive materials of silica/alumina/silica alumina compounds including kaolinites. The active components could be all mixed together before spray drying or separately binded, supported and spray dried using conventional state of the art spray drying technique and conditions used to produce FCC catalyst micro-spheres. These spray dried micro-spheres are then washed, rare earth exchanged and flash dried following conventional methods to produce the finished catalyst particles. The finished micro-spheres containing active materials in separate particles are physically blended in desired proportion to obtain a particular catalyst composition. The preferred range of major physical properties of the finished fresh catalyst which are required for the process of the present invention (UCC) are summarised below:

| Average particle size, micron | 60–80 |
|---|---|
| Particles below 40 microns | <20 |
| Particle size range, microns | 20–120 |
| Apparent bulk density, gm/cc | 0.7–1.0 |

Typically, the above properties and other related physical properties eg. attrition resistance, fluidizability etc. are in similar range as used in conventional FCC process.

PRODUCTS

The main product in the process of the present invention (UCC) is LPG which is obtained with yield upto 40–65 wt. % of fresh feed. The LPG thus produced is highly olefinic with 40–50 wt. % of propylene and about 15–18 wt. % of iso-butylene. The total olefins in LPG is about 90 wt. %. The other gaseous products of the process are dry gas (3–8 wt. %) with about 50% of ethylene. Range of other product yields are given below:

|  | Wt. % fresh feed |
|---|---|
| Dry gas | 2–8 |
| LPG | 40–65 |
| Gasoline ($C_5$-150° C.) | 3–20 |
| Diesel (150–370° C.) | 2–27 |
| Bottom | 1–10 |
| Coke | 3–10 |

Typical LPG composition in the process of invention is given below:

| Component | Wt. % |
|---|---|
| Propylene | 42.1 |
| Propane | 2.7 |
| Total $C_3$ | 44.8 |
| n-Butane | 0.9 |
| iso-Butane | 2.1 |
| iso-Butylene | 18.1 |
| 1-Butene | 10.9 |
| cis-2-Butene | 7.8 |
| trans-2-Butene | 9.9 |
| 1-3 Butadiene | 5.5 |
| Total $C_4$ olefins | 52.2 |
| Total $C_4$ | 55.2 |
|  | 100 |

This shows that the LPG from the process of the present invention (UCC) is highly olefinic and the total LPG olefinicity is more than 90 wt. %.

Typical dry gas composition in the process of the invention is given below:

|  | wt. % |
|---|---|
| Hydrogen | 0.8 |
| Methane | 28.3 |
| Ethane | 20.9 |
| Ethylene | 50.0 |

The process of the present invention (UCC) gasoline octane is more than 90. However, both gasoline and diesel of the process of the present invention (UCC) are more unstable and containing more aromatic compounds as compared to conventional FCC products in the corresponding boiling range. Typical range of properties for the decanted oil (which is the bottom product of the process of the present invention) (UCC) obtained from processing vacuum gas oil in the process of the present invention is given below:

| | |
|---|---|
| Molecular wt. | 300 and above |
| Aromatics, wt % | 50–90 |
| Average no. of aromatic ring per molecule | 2.8–3.2 |
| Average aromatic ring carbon atoms | 13–14 |
| Hydrogen content, wt % | 10–11.5 |
| Conradson coke, wt % | 1.0 and above |

This shows that the decant oil of the process of the present invention (UCC) has higher level of aromaticity due to extreme cracking conditions employed in the process of the present invention and also the aromatics are tri-ring compounds as usually preferred as a feed stock for making carbon black or needle coke.

The following examples will demonstrate the flexibility of the present invention towards various feed stocks and also the quantum of LPG yield that can be produced from this process along with other associated advantages detailed further in the subsequent sections. These examples are to be considered illustrative only and are not to be construed as limiting the scope of the present invention.

EXAMPLE 1

Improved Vanadium tolerance of the process of the present invention catalyst (UCC)

This example illustrates the improved vanadium resistance of the process of the present invention (UCC) catalyst. At this point, it is important to note that present state of the art knowledge in fluid cracking catalyst (FCC) is advanced to such a stage that it is possible to design catalyst which can handle upto 20,000–30,000PPM Nickel on equilibrium catalyst without requiring any Nickel passivators addition. However, in case of Vanadium tolerance, the present limit is considered as 4000–6000PPM on equilibrium catalyst, because Vanadium contamination on equilibrium catalyst actually destroys the zeolite crystallinity and its deleterious effects are pronounced at higher regenerator temperature (which is the case with residual oil cracking). It is, therefore, quite important to improve the Vanadium tolerance of the cracking catalyst if significant resid processing is to be realised. Otherwise, the catalyst addition rate will have to be maintained very high which will bring down the profitability quite significantly. In the above context, it was considered necessary to test the Vanadium tolerance of the process of the present invention (UCC) catalyst particularly at higher levels of Vanadium of upto 21,000PPM level on the catalyst.

Vanadium tolerance of the process of the present invention (UCC) catalyst was evaluated in standard fixed bed Micro Activity Test (MAT) reactor described as per ASTM D-3907 with minor modifications indicated subsequently as modified MAT test. The catalyst to be tested for metal tolerance is first steamed at 788° C. for 3 hours in presence of 100% steam. The steamed catalyst is then tested for its activity as per modified MAT test conditions detailed below. Activity is defined as the weight percent conversion to products boiling below 216° C. including coke make. Further, the steamed catalyst is doped with Vanadium as per Mitchell method, described by B R Mitchell in the research paper entitled 'Metal contaminants of cracking catalyst' and published in Industrial Engineering Chemistry Products Research and Development, page 209–213, Volume no.19 in the year 1980. The vanadium level on the steamed catalyst is maintained at different levels desired. In this study, it was kept at various levels of 0,7500,15000,21000PPM on the catalyst. Feed used in the modified MAT test for activity determination for the undoped and Vanadium doped steamed catalyst samples are as follows:

| | Feed Quality |
|---|---|
| Density, gm/cc @ 15° C. | 0.927 |
| RCR, wt. % | 0.353 |
| Paraffin, wt. % | 43.9 |
| Naphthene, wt. % | 16.66 |
| Aromatics, wt. % | 39.4 |
| Basic Nitrogen, PPM | 437 |
| Total Nitrogen, PPM | 1207 |
| ASTM D1160 distillation | °C. |
| IBP | 310 |
| 5% | 368 |
| 10% | 392 |
| 20% | 410 |
| 30% | 421 |
| 40% | 451 |
| 50% | 462 |
| 80% | 477 |
| 90% | 503 |
| 95% | 532 |
| FBP | 548 |

Composition of the process of the present invention (UCC) catalyst (UCC-1) and the reference FCC catalyst (FCC-1) which were used for testing the Vanadium tolerance are summarised below:

| (UCC-1) | Process of the present invention | (FCC-1) |
|---|---|---|
| Ultra stable Y-zeolite | 4.5 | 15.0 |
| Shape selective Pentasil Zeolite | 12.5 | 0 |
| Bottom selective Active material | 5.0 | 2.0 |
| Rare earth components | 0.5 | 1.8 |
| Nonacidic components & binder | 77.5 | 80.2 |

Vanadium tolerance is defined as the Vanadium level where the catalyst activity is reduced by 30% from initial activity level. Typical conditions during the activity test are as under:

| Modified Micro activity Test Conditions | |
|---|---|
| Reactor | Fixed bed micro activity test reactor as per ASTM D3907 test with following changes |
| Feed injection time | 30 sec. |
| Reaction temprature, °C. | 510 |
| WHSV, hr$^{-1}$ | 40–120 |

The activity retention of the process of the present invention (UCC-1) catalyst at different Vanadium levels are given below:

| Vanadium PPM | Activity Retention |
|---|---|
| 0 | B |
| 7500 | 0.82B |
| 15000 | 0.75B |
| 21000 | 0.70B | where B represents the base activity. Compared to the above data, FCC-1 catalyst at 7500PPM Vanadium level could only retain 55% of its base activity. From the above, it is seen that at 7500PPM Vanadium level, the process of the present invention catalyst retained about 82% of base activity vis-a-vis 55% activity retention with FCC-1 catalyst. The Vanadium tolerance of UCC-1 and FCC-1 catalyst as obtained by the above test, are summarised below:

| Vanadium Tolerance | |
|---|---|
| | Vanadium on catalyst (PPM) |
| FCC catalyst (FCC-1) | 5,500 |
| Ultimate cracking catalyst (UCC-1) | 21,000 |

Based on the above results, it is observed that the vanadium tolerance of the UCC catalyst is about four times more than the conventional FCC catalyst. This is due to the unique composition of UCC catalyst (for example UCC-1) where the major active component, for example, pentasil zeolite is highly stable in nature. This improved vanadium tolerance is quite desirable, particularly, for processing feed stock with high vanadium level. Therefore, due to this improved metal tolerance, typical catalyst make up rate in UCC process is about four times lower as compared to the conventional FCC process using same feed stock.

EXAMPLE 2

Improved Coke, Hydrogen and Dry Gas Selecitivity of UCC catalyst

This example illustrates the improved coke and dry gas selectivity of UCC process. For this purpose, catalyst UCC-1 formulated has been compared with conventional Fluid Cracking Catalyst FCC-1 for dry gas and coke selectivity. Composition of UCC-1 and FCC-1 are already disclosed in Example 1.

Coke selectivity of catalyst is very important in cracking operations, carried out under heat balanced reactor and regenerator set up. Reduction of coke make is even more important while processing residual hydrocarbons. Higher coke make leads to higher regenerator temperature, lower catalyst to oil ratio and more deactivation of the catalyst.

Coke selectivity of the UCC Catalyst was measured by using the same reactor set up and test condition as discussed previously in Example 1. The quality of the feed stock used for the coke selectivity test is also described in Example 1. Coke selectivity was measured for the catalyst ie. UCC-1 and FCC-1 without doping any vanadium and compared at different levels of conversions in the range of 30–60 wt. %. The comparison of coke selectivity of UCC-1 vis-a-vis FCC-1 catalyst is summarised below:

| | Coke make at different conversion, wt. % | | | |
|---|---|---|---|---|
| Catalyst | 30 | 40 | 50 | 60 |
| FCC-1 | 1.6 | 2.4 | 3.0 | 3.7 |
| UCC-1 | 1.0 | 1.6 | 2.0 | 2.5 |

It is observed that UCC-1 has markedly improved coke selectivity at all levels of conversion as compared to FCC-1 catalyst. Moreover, the coke selectivity of UCC-1 catalyst improved further at higher level of conversion vis-a-vis FCC-1 catalyst. Due to this improved coke selectivity of UCC catalyst, it has been possible to produce such significantly higher LPG yield upto 65 wt. % in UCC process still keeping coke yield at lower value. The coke selectivity of UCC-1 is further enhanced at higher metal levels. As for example, at 7500PPM Vanadium level, FCC-1 makes about 3.2 wt. % coke whereas 3 CC-1 produces only 1.5 wt. % coke when compared at same level of conversion. This demonstrates excellent metal tolerance of UCC-1 catalyst not only towards retention of activity but also towards improved coke selectivity behaviour at significantly higher levels of Vanadium.

In line with improved coke selectivity of UCC-1 catalyst, it was observed that UCC-1 catalyst is also able to bring down hydrogen and dry gas make at higher Vanadium level as compared to FCC-1 catalyst. While comparing at same level of conversion with 7500PPM Vanadium doped on UCC-1 and FCC-1 catalyst, it was found that UCC-1 made only 40% hydrogen and about 80% of dry gas as those produced by FCC-1 catalyst. This demonstrates the excellent dry gas and hydrogen selectivity of UCC-1 at higher vanadium level.

EXAMPLE 3

Ultimate Catalytic Cracking with Mixed Vacuum Gas Oil

This example demonstrates the UCC process using mixed vacuum gas oil as feed stock and illustrates the quantum of LPG, propylene and $C_4$ olefins which are produced in the present process of invention. The properties of feed stock and reactor conditions are outlined below:

Feed quality is same as used in Example 1 of this invention.

| Reactor Conditions | |
|---|---|
| Unit used | Riser Pilot Plant |
| Weight Hourly space velocity, $hr^{-1}$ | 60 |
| Riser Temperature, °C. | 560 |
| Catalyst/oil ratio | 20.0 |
| Coke on regenerated catalyst, wt. % | 0.05 |

Catalyst used in this case study is UCC-1 and its composition is described previously in Example-1.

The product yields based on the riser pilot plant runs conducted at the conditions described in this example are summarised below:

| Products Yield Pattern Wt. % of feed | |
|---|---|
| Dry gas | 6.14 |
| LPG | 55.02 |
| Gasoline | 16.62 |
| Heavy Naphtha | 5.65 |
| LCO | 7.19 |
| Bottom | 4.27 |
| Coke | 5.11 |
| Propylene + Butylene | 52.5 |
| 216° C. Conversion | 88.54 |
| 370° C. Conversion | 95.73 |
| Propylene in LPG | 43.0 |
| $C_4$ olefins in LPG | 52.5 |
| iso-Butylene in LPG | 18.14 |

This example demonstrates that it is possible to produce LPG to the extent of 55 wt. % of feed with very high selectivity towards propylene and iso-butylene as compared to the other state of the art processes where LPG yield upto 46 wt. % of feed has been reported and that too for a much lighter feed stock of specific gravity of 0.873 vis-a-vis of 0.927 feed specific gravity used in this example.

EXAMPLE 4

Ultimate Catalytic Cracking with Paraffinic Vacuum Gas Oil

This example demonstrates the higher LPG, propylene and iso-Butylene yield of UCC process while using paraffinic vacuum gas oil as a feed stock. Here, the feed used is a dewaxed oil stream obtained from solvent dewaxing unit. The properties of the dewaxed oil used for Ultimate Catalytic Cracking is given below:

| Quality of Paraffinic Vacuum Gas Oil | |
|---|---|
| ASTM D-1160 Distillation | °C. |
| IBP | 303 |
| 5% | 339 |
| 30% | 378 |
| 50% | 400 |
| 70% | 424 |
| 95% | 464 |
| 99% | 480 |
| Density @ 15° C., gm/cc | 0.86 |
| CCR, wt. % | 0.15 |
| Sulfur, wt. % | 0.05 |

The reactor operating conditions used in paraffinic vacuum gas oil cracking by UCC process are as follows:

| Reactor Conditions | |
|---|---|
| Unit used | Riser Pilot Plant |
| Weight Hourly space velocity, $hr^{-1}$ | 65 |
| Riser Temperature, °C. | 560 |
| Catalyst/oil ratio | 21.0 |
| Coke on regenerated catalyst, wt. % | 0.05 |

Catalyst used in this case study is same as UCC-1 and its composition is described previously in Example 1.

The product yields based on the riser pilot plant runs conducted at the conditions described in this example are summarised below:

| Products Yield Pattern Wt. % of feed | |
|---|---|
| Dry gas | 3.92 |
| LPG | 66.5 |
| Gasoline ($C_5$-150° C.) | 10.42 |
| Diesel (150–370° C.) | 10.53 |
| Bottom (370° C.) | 6.45 |
| Coke | 2.27 |
| 216° C. Conversion | 86.96 |
| 370° C. Conversion | 93.55 |
| Propylene + Butylene | 60.7 |
| Propylene in LPG | 43.12 |
| $C_4$ olefins in LPG | 48.10 |
| iso-Butylene in LPG | 18.20 |

It is seen in this example that if the feed is paraffinic, it is possible to obtain very high LPG yield upto 66.5 wt. % with propylene yield above 40% of LPG and iso-Butylene yield 15% of LPG. The overall yield of propylene and butylene is about 60.7 wt. % which is much higher as compared to other state of the art processes. It may be noted that available processes, as for example, disclosed in U.S. Pat. No. 4980053 claims upto 40 wt. % of propylene and iso-butylene yield on similar type of feed stock. The higher yield of olefinic LPG in UCC process is attributed not only to its superior catalyst selectivities but also to the higher WHSV and lower contact time riser cracking condition which minimized the hydrogen transfer reactions and thereby making LPG rich in olefins. It is also seen that in spite of such extreme catalytic cracking conditions with more than 20 catalyst to oil ratio, the coke and dry gas yield remained significantly lower as compared to other state of the art processes disclosed in U.S. Pat. No. 4980053 using similar type of feed stock.

It is important to note that UCC process operates in riser cracking conditions with relatively higher WHSV, higher catalyst to oil ratio, lower contact time and lower reactor temperature vis-a-vis the bed cracking conditions typically used in the state of the art process, as for example, disclosed in U.S. Pat. No. 4980053.

EXAMPLE 5

Ultimate Catalytic Cracking with Heavy Residue

This example illustrates the performance of UCC process on residual feed stock. Quality of the heavy residue stock used for Ultimate Catalytic Cracking is as follows:

| | Quality of Heavy Residue | |
|---|---|---|
| Feed source | Tar from Visbreaker (Feed A) | Solvent Deasphalted Oil (Feed B) |
| Density, gm/cc @ 115° C. | 0.9893 | 0.9278 |
| RCR, wt. % | 11.37 | 2.91 |
| Basic Nitrogen, PPM | 1340 | 123 |
| Total Nitrogen, PPM | 4200 | 730 |
| Nickel, PPM | 17.8 | 0.30 |
| Vanadium, PPM | 43 | 0.50 |
| Iron, PPM | 10.67 | 1.30 |

Catalyst composition used for UCC process with residue feed is same as of UCC-1 disclosed in Example 1 of this invention.

Reactor for Ultimate Catalytic Cracking of such heavy residue was a short contact time modified micro reactor with stationary catalyst bed and the operating conditions of the reactor are as follows:

|  | Feed A | Feed B |
|---|---|---|
| Reactor Temperature, °C. | 570 | 570 |
| WHSV, hr$^{-1}$ | 120 | 48.31 |
| Catalyst Residence Time, seconds | 10 | 30 |

Product yields as obtained from UCC of the heavy residue based on the conditions as mentioned above, are as follows:

| Wt. % of Feed | Feed A | Feed B |
|---|---|---|
| Dry gas | 6.38 | 5.58 |
| LPG | 43.74 | 54.62 |
| Gasoline (C$_5$–150° C.) | 11.37 | 13.56 |
| Diesel (150–370° C.) | 23.87 | 20.75 |
| Bottom (370$^{+°}$ C.) | 0.77 | 2.45 |
| Coke | 13.80 | 3.0 |
| 216° C. Conversion | 82.61 | 84.74 |
| 370° C. Conversion | 99.23 | 97.55 |
| Propylene in LPG | 42.17 | 40.40 |

It is seen in this example that the feed stock used in feed A is very heavy residue with CCR of 11 wt. % and basic nitrogen of 1340PPM. Feed B ie. deasphalted oil, however, has lower CCR and basic nitrogen level. Based on the results summarised in this example, it is found that it is possible to crack heavy residual oil producing LPG to the extent of 43 wt. % of feed for very heavy residue and upto 55 wt. % for moderately heavy feed stock. Propylene selectivities for these feed stocks were more than 40 wt. % of LPG. The above features of UCC process along with superior Vanadium tolerance and excellent coke and gas selectivity of UCC catalyst, permit refiners for profitable conversion of heavy residues to produce LPG and petrochemical feed stock.

EXAMPLE 6

Optimum Conditions and Catalyst Composition for UCC Process

This example illustrate the variation of LPG yield with respect to catalyst composition and operating conditions. The effect of catalyst compositions on LPG, dry gas and coke yield for a feed having CCR of 7.4 wt. %, density of 0.95 and basic nitroen of 700PPM are shown below:

| Catalyst | UCC-1 | UCC-2 | UCC-3 | UCC-4 |
|---|---|---|---|---|
| Composition |  |  |  |  |
| Shape selective Pentasil zeolite | 12.5 | 0.0 | 17.5 | 11.25 |
| Bottom selective Active material | 5.0 | 5.0 | 2.5 | 5.0 |
| Ultra Stable Y Zeolite | 4.5 | 12.0 | 3.0 | 6.75 |
| Rare earth components | 0.5 | 0.95 | 0.40 | 0.63 |
| Non acidic components & binder | 77.5 | 86.55 | 76.6 | 76.37 |

Reactor for Ultimate Catalytic Cracking of such heavy residue was a short contact time modified micro reactor with stationary catalyst bed and the operating conditions of the reactor are as follows:

| Catalyst | UCC-1 | UCC-2 | UCC-3 | UCC-4 |
|---|---|---|---|---|
| Reactor Temperature, °C. | 570 | 570 | 570 | 570 |
| Catalyst Residence Time, seconds | 10 | 10 | 10 | 10 |

LPG, dry gas and coke yields for similar WHSV range with these catalyst are as follows:

| Catalyst | UCC-1 | UCC-2 | UCC-3 | UCC-4 |
|---|---|---|---|---|
| Yield, wt. % |  |  |  |  |
| Dry gas | 7.7 | 5.61 | 8.32 | 5.79 |
| LPG | 38.23 | 19.27 | 32.38 | 33.1 |
| Coke | 9.44 | 9.18 | 14.0 | 11.05 |

It is seen that in UCC-2, there is zero concentration of shape selective catalyst ie. pentasil, and hence LPG yield is the lowest. Although, shape selective component in UCC-3 is maximum, but bottom cracking and ultra stable Y zeolite components are least which resulted in less LPG for UCC-3 catalyst. The LPG yield with UCC-4 is slightly less compared to UCC-1 due to lower quantity of shape selective component. This example demonstrated that there is an optimum catalyst composition which gives maximum LPG yield with moderate coke and dry gas yield.

The effect of operating parameters, particularly, temperature, on LPG, dry gas and coke yield was tested with a particular catalyst having similar composition to UCC-1 using coker fuel oil (specific gravity of 0.92) as a feed stock. The results are summarised below:

| Temperature, °C. | 530 | 540 | 570 | 590 |
|---|---|---|---|---|
| Yield, wt. % |  |  |  |  |
| Dry gas | 3.39 | 3.43 | 5.63 | 6.88 |
| LPG | 44.01 | 46.49 | 46.90 | 47.48 |
| Coke | 3.28 | 3.43 | 4.03 | 4.42 |

WHSV was kept constant in the above runs. It is seen that LPG yield is increased from 44.01 wt. % to 46.49 wt. % by increasing temperature from 530° C. to 540° C., but LPG increment is less by increasing temperature from 540° C. to 590° C., whereas dry gas and coke yield are increased significantly. This example demonstrated that selecting the correct operating parameter is very important not only for producing maximum LPG yield but also for keeping the dry gas and the coke make at the minimum level.

We claim:

1. A process for selective catalytic cracking of a petroleum-based feedstock to produce a product having a high yield of liquified petroleum gas (LPG) and light olefins having 3 to 4 carbons, the process comprising:
   providing a fluidized bed reactor which is a high velocity riser, continuously circulating fluidized bed reactor;
   providing a solid acidic catalyst comprised of:
   from 1 to 6% by wt. of ultra stable Y-zeolite;
   from 8–25% by wt. of Pentasil zeolite which is shape selective;
   from 0–8% by wt. of an active material which is bottom selective;
   from 0–1% by wt. of rare earth constituents; and
   from 91 to 60% by wt. of nonacidic constituents and binder;

charging the fluidized bed reactor with the solid acidic catalyst and the petroleum-based feedstock; and cracking the petroleum-based feedstock in the presence of the solid acidic catalyst in the fluidized bed reactor operated as follows:

a Weight Hourly Space Velocity (WHSV) ranging from 40 to 120 $hr^{-1}$.

a ratio of solid acidic catalyst to petroleum-based feedstock ranging from 15 to 25, a temperature at the top of the high velocity riser ranging from 530° C. to 600° C., recycled riser products ranging from 0 to 40%, a pressure in the fluidized bed reactor ranging from 1.0 to 4.0 $kg/cm^2$ g, and an amount of steam for dilution and quenching of hydrocarbons ranging from 3 to 50 wt. % of the petroleum-based feedstock, wherein the Pentasil zeolite has a pore size ranging from 5 to 6Å so that the catalyst is highly selective for LPG and $C_4$ light olefins with minimum dry gas and coke make, and so that the vanadium tolerance of the catalyst is increased and ranges up to 21,000PPM, and wherein the process produces a LPG yield ranging up to 40 to 65 wt. % of the fresh petroleum-based feedstock, a selectivity for the light olefins of at least 40 wt. %, and a selectivity for the LPG of at least 45 wt. %.

2. The process as claimed in claim 1, further comprising:

separating spent solid acidic catalyst from the hydrocarbon product;

removing entrained hydrocarbons from the spent solid acidic catalyst by passing the spent solid acidic catalyst through a stripper;

burning the spent solid acidic catalyst in a fluidized bed regenerator in the presence of an oxygen containing gas and at a temperature ranging from 650° C. to 750° C. to burn off the coke and provide a regenerated solid acidic catalyst; and continuously circulating the catalyst between the fluidized bed reactor and the fluidized bed regenerator.

3. The process as claimed in claim 2, wherein the regenerated solid acidic catalyst has an amount of coke which does not exceed 0.3 wt. %.

4. The process as claimed in claim 3, wherein the regenerated solid acidic catalyst has an amount of coke which does not exceed 0.1 wt. %.

5. The process as claimed in claim 2, wherein the spent solid acidic catalyst resides in the stripper for a residence time which does not exceed 40 secs.

6. The process as claimed in claim 2, wherein the spent catalyst and the regenerated catalyst have respective coke contents, and wherein delta coke is the difference between the coke contents of the spent catalyst and the regenerated catalyst and ranges from 0.3 to 0.6 wt. %.

7. The process as claimed in claim 1, wherein the catalyst comprises:

from 3.5 to 4.5% by wt. of ultrastable Y-zeolite;

from 12 to 20% by wt. of Pentasil zeolite which is shape selective;

from 0 to 0.5% by wt. of active material which is bottom selective;

from 0 to 0.5% by wt. of rare earth constituents; and from 84.5 to 70.5% by wt. of non-acidic constituents and binder.

8. The process as claimed in claim 1, wherein the fluidized bed reactor is operated as follows:

a Weight Hourly Space Velocity (WHSV) ranging from 50 to 80 $hr^{-1}$, a ratio of solid acidic catalyst to petroleum-based feedstock ranging from 18 to 22, a temperature at the top of the riser ranging from 550° C. to 570° C., recycled riser products ranging from 0 to 40%, a pressure in the fluidized bed reactor ranging from 1.0 to 4.0 $kg/cm^2$ g, and an amount of steam for dilution and quenching of hydrocarbons ranging from 20 to 35 wt. % of the petroleum-based feedstock as a function of quality of the petroleum-based feedstock.

* * * * *